United States Patent [19]

Erickson et al.

[11] Patent Number: 4,631,609

[45] Date of Patent: Dec. 23, 1986

[54] STRETCHED SURFACE RECORDING DISK SUBSTRATE

[75] Inventors: Leif O. Erickson, Hudson, Wis.; Vurnen J. Leonard, Minneapolis, Minn.

[73] Assignee: Minnesota Mining and Manufacturing Company, St. Paul, Minn.

[21] Appl. No.: 580,892

[22] Filed: Feb. 16, 1984

[51] Int. Cl.⁴ ............................................. G11B 5/82
[52] U.S. Cl. .................................................. 360/135
[58] Field of Search ................ 360/135, 133; 369/280, 369/283, 284, 287; 346/137; 428/64, 65

[56]  References Cited

U.S. PATENT DOCUMENTS

| | | | |
|---|---|---|---|
| 3,336,583 | 8/1967 | Comstock | 360/135 |
| 3,373,413 | 3/1968 | Treseder | 340/174.1 |
| 3,509,274 | 4/1970 | Kihara | 178/6.6 |
| 3,537,083 | 10/1970 | Voth | 340/174.1 |
| 3,599,226 | 8/1971 | Lips | 346/74 MD |
| 3,805,292 | 4/1974 | Hashiguchi et al. | 360/135 |
| 4,365,257 | 12/1982 | Gerfast | 346/137 X |
| 4,449,139 | 5/1984 | Geyer et al. | 346/137 |
| 4,451,836 | 5/1984 | Leonard et al. | 346/137 |
| 4,573,097 | 2/1986 | Pastor et al. | 360/135 |

OTHER PUBLICATIONS

Pat. appln., "Stretched Surface Recording Disk and Method of Manufacture", Pastor, U.S. Ser. No. 433,953 filed 10/13/82.

Primary Examiner—Stuart N. Hecker
Assistant Examiner—Benjamin E. Urcia
Attorney, Agent, or Firm—Donald M. Sell; James A. Smith; David W. Anderson

[57] ABSTRACT

A stretched surface recording disk includes an annular substrate to which are adhesively attached magnetic recording films covering each major surface of the substrate. The substrate has annular ridges adjacent its inner and outer diameters which support the film above and parallel to each major surface and film attachment surfaces adjacent the ridges which are radiused an amount sufficient to place the adhesive in compression, preferably about 0.030 inches (0.80 mm).

7 Claims, 6 Drawing Figures

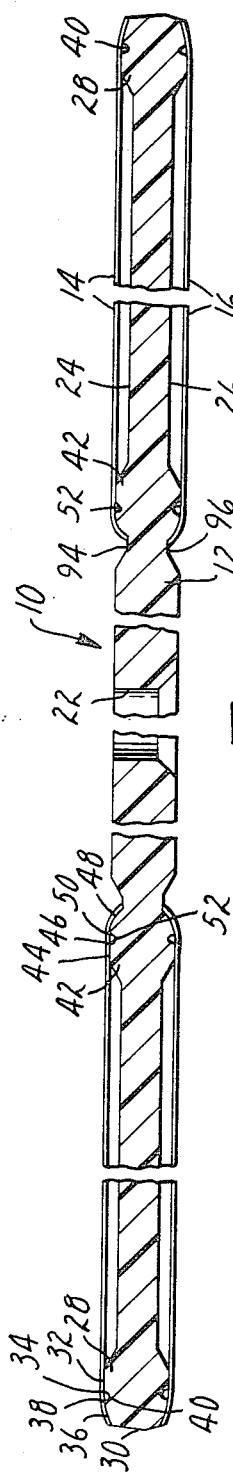
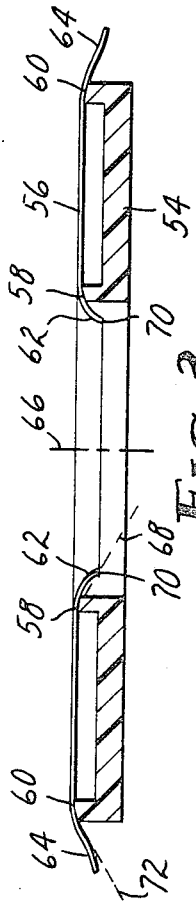
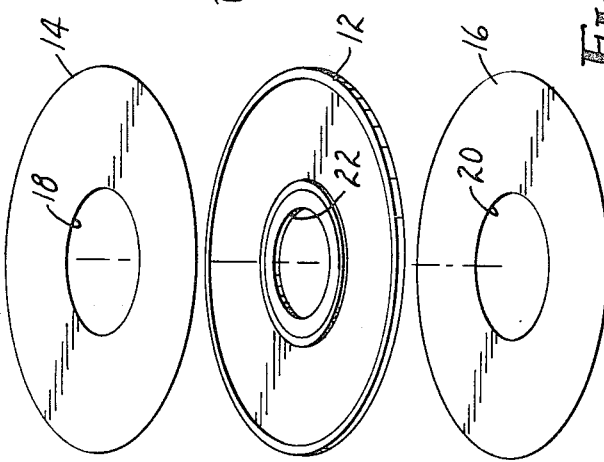

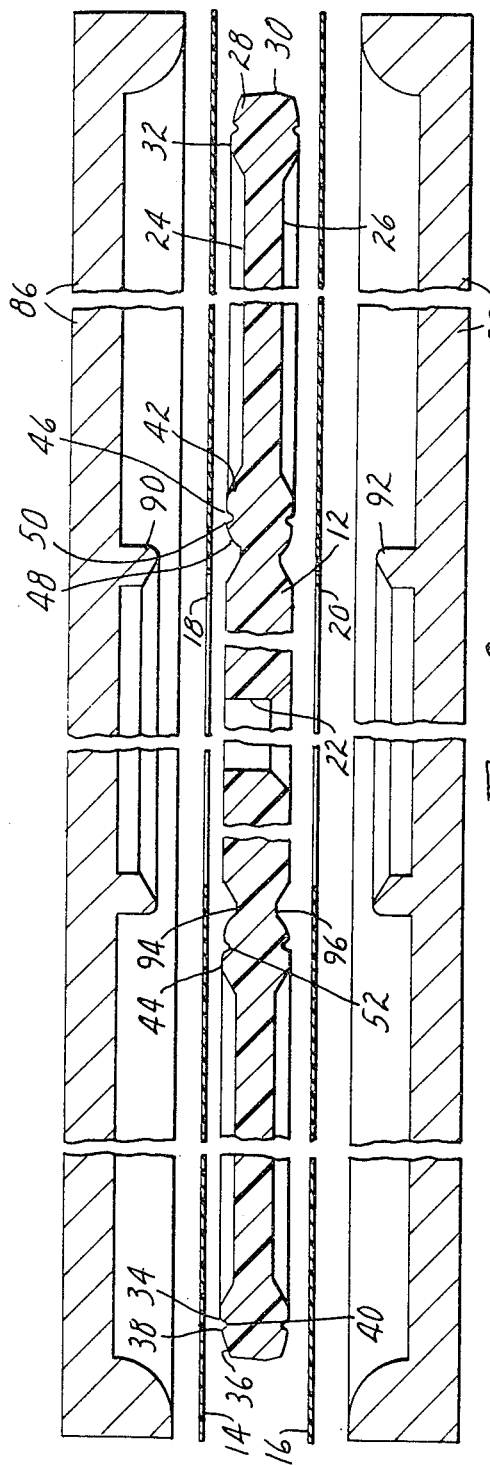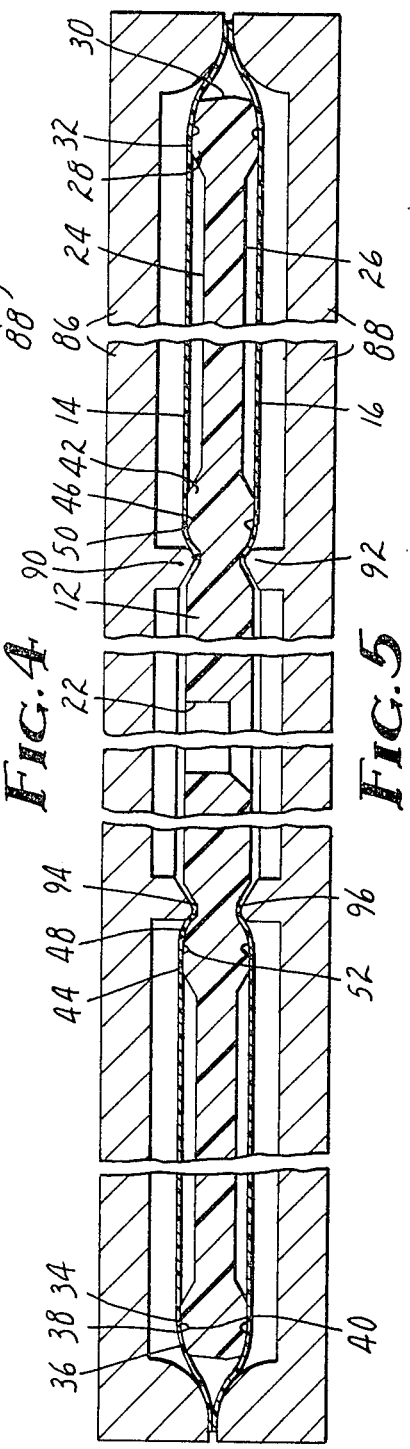

STRETCHED SURFACE RECORDING DISK SUBSTRATE

BACKGROUND OF THE INVENTION

1. Technical Field of the Invention

This invention relates to magnetic recording media and, particularly, flexible magnetic recording sheets stretched across and adhesively attached to opposite major surfaces of a disk-shaped support to provide planar recording surfaces.

2. Description of the Prior Art

Conventional, commercially available linear tape recording systems have excellent fidelity characteristics, are durable and are relatively inexpensive. The main shortcoming of linear tape systems is that access to information located on widely separated portions of the tape requires a relatively large amount of time in winding and rewinding the tape.

A disk configuration, on the other hand, will allow random access to different portions of the recorded information since all of the information is available on a single plane. In addition, a plurality of magnetic transducer heads may be used in conjunction with a disk to provide rapid access to random portions of the information recorded on the disk. Thus, while the disk configuration functions the same as the linear tape configuration in that audio or video signals are imparted to a magnetic, iron-oxide coated film and reproduced from this film by means of a transducer head as the iron-oxide coated film is transported relative to the head, the disk configuration has greater utility than the tape configuration because the information recorded on the disk is located in a single plane. This allows the transducer head to rapidly access widely separated portions of the recorded material, an advantage which is not possible with linear tape configurations.

One type of recording disk presently in wide-spread use is the so-called "floppy" disk, such as illustrated in U.S. Pat. No. 3,668,658 issued to Flores et al. This disk type consists of a relatively thick sheet of polymeric material which includes a magnetizable surface coating. Floppy disks are both inexpensive and convenient to use. Drawbacks associated with this type of disk, however, are that the disk experiences relatively large dimensional changes in response to temperature and humidity fluctuations and that a pressure pad opposite the transducer head is required which causes wear, limits the rotational speed and, hence, reduces access times.

The development of stretched surface recording (SSR) disks has progressed over the years from a rather simple configuration described in U.S. Pat. No. 3,373,413, issued to Treseder, in which a film was stretched and clamped between two circular rings, to a dish-shaped support to which a stretched film was attached at the periphery as illustrated by U.S. Pat. No. 3,509,274, issued to Kihara. Subsequently, U.S. Pat. No. 3,537,083, issued to Voth, introduced the concept of bonding the film at the center of the support in addition to the support periphery, and U.S. Pat. No. 3,599,226, issued to Lips, described an SSR disk which included two stretched film surfaces on either side of the support which were attached at the periphery and the center of the support.

Although the patents described above have illustrated the general configuration and many desirable features of SSR disks, many practical problems yet remain as impediments to the mass production and general acceptance of SSR disks as a recording medium. These include the problems of economically and reliably attaching a very thin film to a relatively thick substrate, ensuring that the film remains at a desired tension and planar with respect to the support, thermal expansion differentials between the support and the film, reduction of usable recording area by the area necessary for bonding the film to the support, and the useful life of the bond between the film and the support.

The major problems associated with SSR disks is ensuring that the films remain planar and achieving a reliable bond between the film and the substrate. The film may be maintained in a planar condition by providing the substrate with raised, radially inward and outward ridges which project above the major surfaces of the substrate and provide reference surfaces across which the film may be stretched. It was thought that a reliable bond between the film and the substrate could be achieved by providing annular, sloped film attachment surfaces inward and outward of the inner and outer annular ridges, respectively, which were below the level of the reference surfaces produced by the raised ridges. It was found, however, that a flat sloped surface did not yield an adequate adhesive bond between the film and the substrate because of a peculiar property of annular films bent around an annular support.

If an annular film is bent around an annular fulcrum located near the inner diameter of the film, the film assumes a downwardly concave contour between the fulcrum and the tool used to pull the film around the fulcrum. The film at a fulcrum located near the outer diameter of the annular film assumes a downwardly convex contour between the fulcrum and the tool used to stretch the film around the outer fulcrum. Thus, the contour of the film as stretched around the reference surfaces described above will not conform to a flat bonding surface, even if this bonding surface is sloped downwardly with respect to the plane of the substrate. It has been found that this contour effect of the stretched film is related to the diameter of the annular fulcrum around which the film is stretched and is more severe as the diameter of the annular fulcrum decreases.

SUMMARY OF THE INVENTION

To ensure that a stretched surface recording film remains planar with respect to its substrate and to ensure that the film is reliably adhesively bonded to the substrate, a stretched surface recording (SSR) disk substrate according to the present invention provides inner and outer raised, annular ridges which define references surfaces projecting above the major surfaces of the substrate and which support the film in a planar condition and parallel with respect to the plane of the substrate and film attachment surfaces adjacent the ridges which are radiused to enhance the adhesive bonding of the film to the film attachment surfaces. In summary, the substrate includes a raised annular first ridge adjacent the outer edge of the substrate which projects above the major surface of the substrate to define a reference surface upon which the film is suppoted above the major surface, the first ridge having a radially outward edge defining a fulcrum around which the film is drawn toward the major surface of the substrate to tension the film; a raised, annular second ridge adjacent the inner edge of the substrate which projects above the major surface of the substrate a distance equal to the projection of the first ridge to define a reference surface upon which the film is supported above and parallel to the major surface of the substrate, the second ridge having a radially inward edge defining a fulcrum around which the film is drawn toward the major surface of the substrate to tension the film; an annular outer film attachment surface located radially outward of the first ridge and sloping outwardly and downwardly toward the plane of the major surface of the substrate from a point of maximum spacing above the major surface adjacent the first ridge and intermediate the first ridge and the major surface of the substrate; an annular inner film attachment surface radially inward of the second ridge fulcrum and curved radially inwardly and downwardly toward the major surface of the substrate from a point of maximum spacing above the major surface adjacent the second ridge fulcrum and intermediate the second ridge fulcrum and the major surface of the substrate, the inner film attachment surface having a radius equal to or less than the contour assumed by the film as the film is drawn around the second ridge fulcrum toward the major surface of the substrate; and adhesive disposed on the inner and outer film attachment surfaces which secures the film to the substrate.

A property common to adhesives is that they perform much better in response to shear forces than tension forces. This means that if a film is adhesively attached to a surface of a substrate, the adhesive will resist extremely well any attempt to move the film parallel to the substrate, because the adhesive is then placed in shear, but will be unable to effectively resist an attempt to peel the film in a direction normal to the substrate surface because the adhesive is placed in tension. In addition to recognizing that the film attachment surfaces, particularly the inner film attachment surface, must be radiused to ensure an adequate bond between the film and the substrate, the present invention also recognizes that desirable compression of the adhesive between the stretched film and the film attachment surfaces is increased as the radius of the film attachment surfaces decreases, i.e. as the film attachment surfaces become sharper, and describes by means of a formula the film attachment surface radius at which the adhesive is placed in a desirable compression mode rather than an undesirable tension mode.

BRIEF DESCRIPTION OF THE DRAWINGS

The present invention will be more thoroughly described with reference to the accompanying drawings wherein like numbers refer to like parts in the several views, and wherein:

FIG. 1 illustrates in cross-section a stretched surface recording (SSR) disk which includes a substrate and two adhesively attached films;

FIG. 2 is an exploded perspective view of the substrate and films of FIG. 1;

FIG. 3 illustrates in cross-section a simplified substrate similar to that of FIG. 1, and a single stretched film;

FIG. 4 illustrates in cross-section the substrate and films of FIG. 1 and tooling used in the manufacture of the SSR disk of FIG. 1 prior to assembly of the films to the substrate;

FIG. 5 illustrates in cross-section the substrate, films and tooling of FIG. 4 subsequent to assembly of the film to the substrate.

DESCRIPTION OF THE PREFERRED EMBODIMENT

Figure 6:
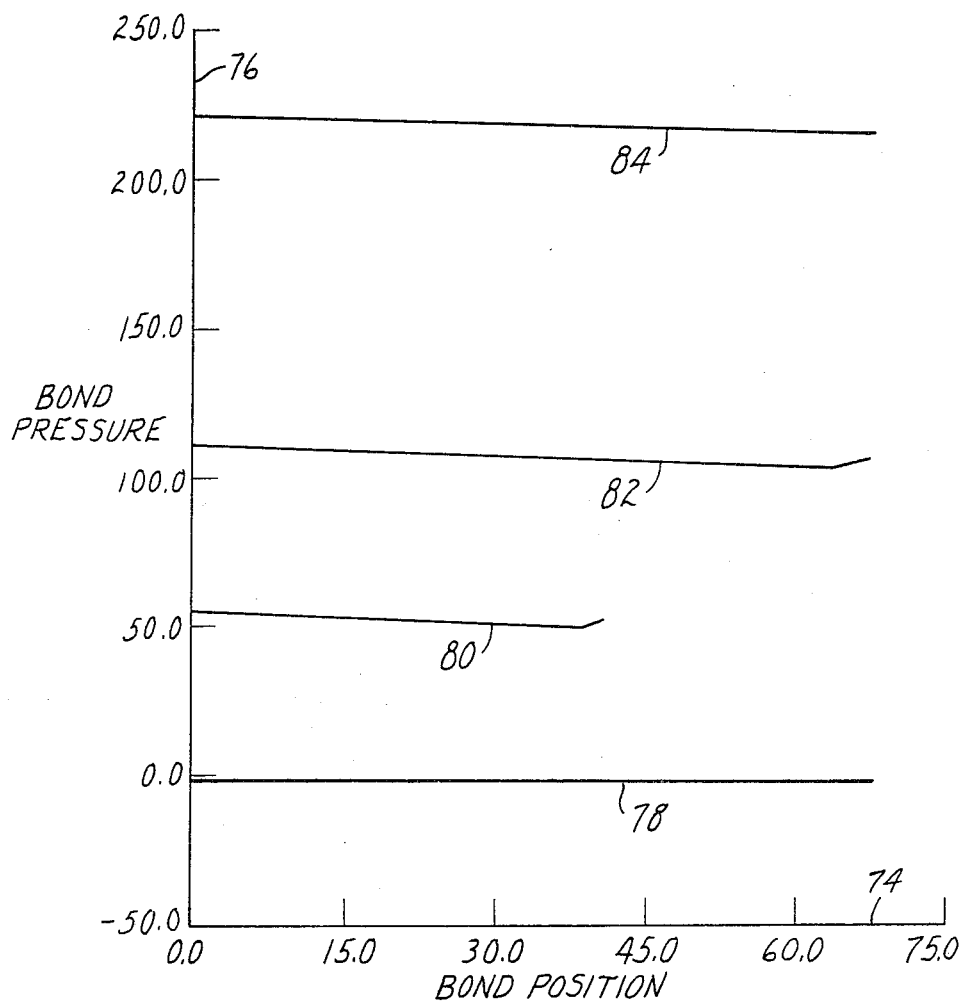
FIG. 6 is a graphical illustration of the relationship between pressures between the films and the substrate and the radius of a film attachment surface of the substrate.

FIG. 1 illustrates in cross-section a stretched surface recording (SSR) disk, generally indicated as 10, which includes a substrate 12 to the upper and lower major surfaces of which is attached films 14 and 16, respectively. The films 14 and 16 are tensioned prior to attachment to the substrate 12, are polymeric, preferably polyester, have a thickness of approximately 0.0015 inches (0.04 mm) and are coated with an iron oxide or similar magnetizable substance to provide in the unsupported region of the films 14 and 16 a resilient and deformable surface which may be used to magnetically record electronic signals impressed thereon by a magnetic transducer of the type well known in the audio and/or recording arts.

As illustrated by FIG. 2, the films 14 and 16 are annular, with central cut portions defining inner diameters 18 and 20 which allow access to the inner diameter 22 of the substrate 12. Although the annular configuration of the films 14 and 16 prior to attachment to the substrate 12 is preferred, the films 14 and 16 could be initially circular and the inner diameters 18 and 20 cut subsequent to attachment of the films 14 and 16 to the substrate 12.

Returning to FIG. 1, the substrate 12 is likewise formed of a polymer, preferably polyphenylene sulfide which is chosen for its strength and thermal expansion properties, and includes an upper major surface 24 and a lower major surface 26 above which the films 14 and 16 are supported. The outer diameter of the substrate 12 is approximately 5.120 inches (130 mm) and the maximum thickness of the substrate 12 is approximately 0.075 inches (1.90 mm). Hereinafter the substrate 12 and its attached films 14 and 16 will be described only with respect to the upper major surface 24, it being understood that the substrate 12 is symmetrical and that features and effects described with respect to the upper major surface 24 apply equally with respect to the lower major surface 26.

Projecting upwardly from the major surface 24 is a raised ridge 28 adjacent the outer periphery 30 of the substrate 12 which terminates in a reference surface 32 which supports the film 14 and determines the spacing between the film 14 and the major surface 24 of the substrate 12. The raised ridge includes a radially outward corner which defines a fulcrum 34 around which the film 14 is drawn downwardly toward the major surface 24 to tension the film 14.

Radially outward of the fulcrum 34 and between the fulcrum 34 and the periphery 30 of the substrate 12 is an outer film attachment surface 36 which is radiused to slope outwardly and downwardly from a point of maximum spacing 38 above the major surface 24 located intermediate the fulcrum 34 and the major surface 24. The outer film attachment surface 36 is coated with an adhesive, which may be a cyanoacrylate (not shown), which is utilized to attach the film 14 to the attachment surface 36. The outer film attachment surface 36 has a specific radius of curvature which is selected to place the adhesive between the attachment surface 36 and the film 14 in compression, as will be described in greater detail below.

Radially intermediate the reference surface 32 and the film attachment surface 36 is an adhesive groove 40 which is provided to intercept any adhesive which may be forced from the film attachment surface 36 by the film 14 and prevent such adhesive from reaching the reference surface 32 and interfering with contact between the film 14 and the reference surface 32.

Adjacent the inner diameter 22 of the substrate 12 is an inner raised ridge 42 which, like the outer raised ridge 28, terminates in a reference surface 44 which is spaced above the major surface 24 of the substrate 12 a distance equal to the spacing of the outer reference surface 32 above the major surface 24 to support the inner portion of the film 14 parallel to the plane of the major surface 24. The inner raised ridge 42 includes a radially inward corner which defines a fulcrum 46 around which the film 14 may be drawn to provide tension in the film 14. Although the inner and outer raised ridges 28 and 42 have been illustrated as rectangular in cross-section, the ridges 28 and 42 could assume many cross-sectional shapes and still operate effectively to space the film 14 above the major surface 24 of the substrate 12 and provide fulcrums 34 and 46 around which the film 14 could be drawn. For example, the ridges 28 and 42 could be triangular in cross-section with a rounded apex. The apex would at once provide a reference surface for the film 14 and a fulcrum around which the film 14 could be drawn.

Radially inward of the fulcrum 46 is an inner film attachment surface 48 which is radiused to curve inwardly and downwardly toward the plane of the major surface 24 from a point of maximum spacing 50 above the plane of the major surface 24 and intermediate the major surface 24 and the ridge fulcrum 46. An adhesive (not shown) is disposed on the inner film attachment surface 48 to bond the film 14 to the substrate 12. Like the outer film attachment surface 36, the inner film attachment surface 48 has a particular radius selected to ensure that the adhesive coating the attachment surface 48 will be placed in compression. Selection of the radius of the inner film attachment surface 48 will be described more fully below.

Radially intermediate the inner ridge fulcrum 46 and the inner film attachment surface 48 is an adhesive groove 52 which functions to intercept any adhesive squeezed from between the film attachment surface 48 and the film 14 and prevent such adhesive from interfering with contact between the film 14 and the reference surface 44.

The necessity of providing radiused film attachment surfaces 36 and 48 is best explained with reference to FIG. 3, which illustrates a simplified substrate 54 across which is stretched an annular film 56 which is identical to the film 14 shown in FIGS. 1 and 2. The substrate 54 includes an inner fulcrum 58 and an outer fulcrum 60 such as is produced by the raised ridges 28 and 42 of FIG. 1. The remaining features of the substrate 12 of FIG. 1, such as the film attachment surfaces 36 and 48 and the adhesive grooves 40 and 52 have been eliminated for clarity of description.

It has been discovered that when an annular film 56 is drawn across an annular fulcrum, such as the inner annular fulcrum 58 or the outer annular fulcrum 60, and drawn downwardly toward the plane of the substrate 54 to tension the film 56 that the film 56 behaves in a totally unexpected manner in the vicinity of the fulcrums 58 and 60. It has been found that the portion 62 of the film 56 radially inward of the inner fulcrum 58 assumes a downwardly concave contour rather than a straight but perhaps wrinkled configuration as would be expected, and that the portion 64 of the film radially outward of the outer annular fulcrum 60 assumes a downwardly convex contour rather than a straight configuration as would be expected. It has further been found that this contouring effect persists regardless of the stress placed on the film 56, although the contours assumed by the film 56 are inversely proportional to the stress placed on the film 56 and, therefore, decrease with increasing film tension. The contouring effect is also inversely proportional to the radius of the annular fulcrums 58 and 60 from the center 66 of the substrate 54. Therefore, the contouring effect will be less at the outer fulcrum 60 and more pronounced at the inner fulcrum 58.

The curvature of the films inward and outward of the fulcrums 58 and 60 is described by the equation:

$$p = s\left(\frac{1}{r_x} + \frac{\sin\theta}{x}\right) \text{ where:}$$

p = the pressure in pounds per square inch (newtons per square mm) between the film 56 and the radiused film attachment surfaces 36 and 48, which are nonexistent in FIG. 3;

s = the film tension in pounds per inch (newtons per mm) of circumference of the outer fulcrum 60;

$r_x$ = the radius, in inches (mm), of the film portions 62 and 64 at a radial distance "x", in inches (mm), from the central axis 66 of the substrate 54;

$\theta$ = the slope of the film 14 at the distance "x" from the center line of the substrate 12;

x = the radial distance, in inches (mm), from the center line of the substrate 12.

To determine the free, natural radius assumed by the portion 64 of the film outward of the outer annular fulcrum 60, p is equal to zero because the film 64 is not in contact with the substrate 54 and does not exert a pressure on the substrate 54, and the preferred dimensions of the remaining elements of the equation are: x = 2.5 inches (63.5 mm), and $\theta$ equals $-10$ degrees (the term is negative because of a chosen convention which considers an inward and downward slope as positive). Solving the equation for $r_x$, it is determined that the radius of the film portion 64 is equal to approximately 14.4 inches (366 mm). The same analysis for the portion of the film 62 inward of the inner annular fulcrum 58 reveals a radius of $-6.05$ inches ($-154$ mm). The difference in sign indicates that the curvatures of the films 64 and 62 are opposite and that the inner portion 62 of the film 56 is downwardly concave.

Although these radii of the curvature of the film 56 as it is drawn downwardly toward the substrate 54 do not appear to deviate greatly from a flat, straight configuration, and are exaggerated in FIG. 3 for clarity, they nevertheless have been found to create severe problems with respect to the adhesive bond between the film 56 and the substrate 54. This is particularly true with respect to the portion 62 of the film 56 which is inward of the inner annular fulcrum 58. Because the curvature of the inner portion 62 is downwardly concave, and because of the relative severity of the curvature of this film portion 62, problems would be encountered if it were attempted to adhesively bond the inner portion 62 of the film 56 to a flat, sloped portion of the substrate 54, as indicated by the dashed line 68.

Adhesives perform much better in a shear mode than in a tension mode and a thin, uniform thickness of adhesive between the surfaces to be bonded is preferable. If it were attempted to adhesively secure the inner portion 62 of the film 56 to a flat sloped portion of the substrate 54 as is illustrated by the dashed line 68, the result would be that adhesive between the film portion 62 and the attachment surface 68 midway between the annular fulcrum 58 and the inner edge 70 of the film portion 62 would be placed in tension because the curvature of the film portion 62 would attempt to pull away from the attachment surface 68 in a direction normal to the surface 68. Also, the thickness of the adhesive between the surface 68 and the film portion 62 would not be uniform from the fulcrum 58 to the edge 70 of the film. The adhesive thickness would be greater midway between the fulcrum 58 and the edge 70 of the film 62 than toward either the fulcrum 58 or the edge 70. The facts that the adhesive between the film portion 62 and the surface 68 is not uniform and that the adhesive is placed in tension combine to produce an unreliable adhesive bond between the inner portion 62 of the film 56 and a flat attachment surface such as that illustrated by the dashed line 68.

Considering now the portion 64 of the film 56 outward of the outer annular fulcrum 60, it is found that the detrimental effects of the curvature of the film 64 are much less severe than those which occur at the inner fulcrum 58. This is because the radius of curvature of the outward portion 64 of the film 56 is much larger, and therefore more nearly flat, than the radius of the inner portion 62, and because the contour is downwardly convex rather than concave as is the situation inward of the inner fulcrum 58. Because the contour is downwardly convex at the outer portion 64 of the film 56, if it were attempted to secure this portion 64 to a flat attachment surface, such as indicated by the dashed line 72, the film portion 64 would progressively contact the surface 72 as the film 64 is drawn downwardly from the fulcrum 60 and would be effective to squeeze the adhesive in a direction from the fulcrum 60 toward the substrate 54. Therefore, the reverse contour of the outer portion 64 of the film 56 would cause the adhesive coating to become uniform rather than trapping a nonuniform bulge of adhesive between the fulcrum 58 and the edge 70 of the film 56 as happens at the inner portion 62 of the film 56.

FIG. 6 graphically represents the effect of the radius of the inner film attachment surface 48 on the adhesive bond between the film 14 and the attachment surface 48. The abscissa 74 of the graph of FIG. 6 represents the angular position along the film attachment surface 48, with zero degrees representing the position at which a vertical line, perpendicular to the plane of the substrate 12, passes through the point of maximum spacing 50 of the inner film attachment surface 48 above the major surface 24 of the substrate 12, with increasing angles indicating positions along the inner film attachment surface 48 downwardly toward the major surface 24. The ordinate axis 76 represents bond pressure between the film 14 and the attachment surface 48, in pounds per square inch, which is the pressure exerted by the film 14 on the attachment surface 48. The curves 78–84, therefore, illustrate the pressure exerted on the attachment surface 48 by the film 14 at positions along the film attachment surface for various radii of the attachment surface 48. Curve 78 represents a radius of curvature of the film attachment surface 48 of infinity, i.e. the film attachment surface 48 is flat, curve 80 represents a film attachment surface 48 radius of 0.060 inches (1.52 mm), curve 82 represents a film attachment surface 48 radius of 0.030 inches (0.76 mm) and curve 84 represents a film attachment surface 48 radius of 0.015 inches (0.38 mm).

From a consideration of the curves 78–84 a number of conclusions may be drawn concerning the adhesive bond between the film 14 and the film attachment surface 48. First, curve 78, which represents a flat film attachment surface, indicates that the contour of the annular film 14 does indeed cause the bond pressure between the film 14 and the attachment surface 48 to be negative if it is attempted to attach the film 14 to a flat attachment surface 48. This means that the adhesive would be placed in tension between the film 14 and the attachment surface 48 in a direction normal to the attachment surface 48. Such a situation would produce an unreliable adhesive bond because adhesives do not perform well under tension. Second, the curves 78–84 indicates that the bond pressure exerted by the film 14 on the film attachment surface 48 does not vary considerably over the arcuate length of the film attachment surface 48. This means that while the film attachment surface 48 must be radiused, the attachment surface 48 can assume a simple circular curvature rather than a more complex profile. Third, the curves 78–84 indicate that the bond pressure between the film 14 and the film attachment surface 48 increases as the radius of curvature of the attachment surface 48 decreases, i.e. the bond pressure becomes greater as the curvature of the attachment surface 48 becomes sharper. This is significant because it allows a mechanism by which the thickness of the adhesive between the film 14 and the attachment surface 48 may be adjusted.

As the film 14 is progressively wrapped around the film attachment surfaces 36 or 48 by forcing the film 14 downwardly toward the major surface 24 of the substrate 12, adhesive will be progressively squeezed from between the film attachment surfaces 36 and 48 and the film 14 and toward the plane of the major surface 24, provided that the attachment surfaces 36 and 48 are radiused sufficiently to produce a positive bond pressure between the film 14 and the attachment surfaces 36 and 48. In general, adhesives exhibit a maximum thickness at which the adhesive will function reliably and the rate at which an adhesive may be squeezed from the surfaces of the film attachment surfaces 36 and 48 and the film 14 depends upon the viscosity and viscoelastic properties of the particular adhesive utilized. Depending upon the particular adhesive and the rate at which the film 14 is to be drawn over the film attachment surfaces 36 and 48, therefore, there will exist a particular bond pressure at which the adhesive will operate most reliably. This bond pressure can be determined empirically by varying such pressure and testing the adequacy of the adhesive bond achieved. Since the bond pressure between the film 14 and the film attachment surfaces 36 and 48 is shown in the graph of FIG. 6 to be dependent upon the radius of the film attachment surfaces 36 and 48, a most desirable attachment surface 36 and 48 radius may be selected depending upon the bond pressure desired. This radius will always be less than the contour assumed by an unsupported film drawn around a fulcrum such as 58 or 60 of FIG. 3, because only then will there exist a positive bond pressure. The maximum radius of the film attachment surfaces 36 and 48 is equal to the natural, free radius of the film 56 determined from the equation offered above with respect to FIG. 3, and the bond pressure will depend upon the film attachment surface 36 and 48 radius as indicated by the graph of FIG. 6. It has been determined that a bond pressure of approximately 100 psi is desirable when using cyanoacrylate adhesives and thus it is indicated from the graph of FIG. 6 that this adhesive would demand a film attachment surface 48 which is preferably radiused at 0.030 inches (0.80 mm). It may be shown that the radius of the film attachment surfaces 36 and 48 dominates the calculation of bond pressure, even though the film 14 attempts to curve oppositely at the inward and outward portions of the substrate 12. Therefore, analysis of the outer film attachment surface 36 likewise yields a preferred radius of 0.030 inches (0.080 mm).

FIGS. 4 and 5 illustrate the method of assembling the SSR disk 10 of FIG. 1. Referring to FIG. 4, the film attachment surfaces 36 and 48 of the substrate 12 are coated with adhesive and the substrate 12 is placed over the lower film 16 which is maintained in radial tension. The upper film 14 is then positioned over the substrate 12 and likewise maintained in radial tension. As illustrated by FIG. 5, an upper clamping fixture 86 and a lower clamping fixture 88 are then brought into contact with the films 14 and 16 to draw the films 14 and 16 together radially beyond the periphery 30 of the substrate 12, thereby producing additional tension on the films 14 and 16 and also drawing the films 14 and 16 around the outer annular fulcrums 34 and into contact with the outer film attachment surfaces 36. Simultaneously, inner, annular tensioning hoops 90 and 92 located on the upper 86 and lower 88 clamping fixtures, respectively, enter relief grooves 94 and 96 formed in the substrate 12 and thereby force the films 14 and 16 around the inner annular fulcrums 46 and into contact with the inner film attachment surface 48. After the adhesive is cured, as by heating, the clamping fixtures 86 and 88 are removed and the films 14 and 16 trimmed adjacent the film attachment surfaces 36 and 48 to produce a completed SSR disk 10 as illustrated in FIG. 1.

It is apparent that modifications of the described embodiments will be apparent to those skilled in the art, and all such modifications falling within the spirit and scope of the appended claims are intended to be considered part of the invention.

What is claimed:

1. A stretched surface recording disk including an annular substrate and an annular or circular film stretched across at least one of the major surfaces of said substrate and adhesively secured thereto, said substrate comprising:

a raised annular first ridge adjacent the outer periphery of said substrate, said first ridge projecting above said major surface to define a reference surface upon which said film is supported above said major surface and including a radially outward edge defining a fulcrum around which said film may be drawn downwardly toward said major surface to tension said film;

a raised, annular second ridge adjacent the inner diameter of said substrate, said second ridge projecting above said major surface a distance equal to the projection of said first ridge to define a reference surface upon which said film is supported above and parallel to said major surface and including a radially inward edge defining a fulcrum around which said film is drawn downwardly toward said major surface to tension said film;

an annular outer film attachment surface located radially outward of said first ridge and sloping from a point adjacent said first ridge fulcrum and intermediate said major surface and said first ridge fulcrum outwardly and downwardly toward the plane of said major surface;

an annular inner film attachment surface radially inward of said second ridge fulcrum and curved radially inwardly and downwardly toward said major surface from a point adjacent said second ridge fulcrum and intermediate said second ridge fulcrum and said major surface, said inner film attachment surface having a radius equal to or less than the radius of the contour assumed by said film as said film is drawn around said second ridge fulcrum toward said major surface; and adhesive disposed on said inner and outer film attachment surfaces for securing said film to said substrate.

2. A stretched surface recording disk according to claim 1 wherein the maximum radius of said inner film attachment surface is defined by the equation:

$$r_x = \frac{x}{\sin \theta}$$

wherein:
$r_x$ = said maximum radius of said inner film attachment surface;
x = the radius from the central axis of said substrate to the radial midpoint of said inner film attachment surface in units identical to those of $r_x$;
$\theta$ = the slope of said inner film attachment surface at the radial distance "x" from the central axis of said substrate.

3. A stretched surface recording disk according to claim 1 wherein said radius of said inner film attachment surface is less than the radius of the contour assumed by said film sufficient to place said adhesive in compression.

4. A stretched surface recording disk according to claim 3 wherein the diameter of the midpoint of said inner film attachment surface is about 55 mm and said inner film attachment surface has a radius of about 0.8 mm.

5. A stretched surface recording disk according to claim 1 wherein said outer film attachment surface is curved with a radius equal to that of said inner film attachment surface.

6. A stretched surface recording disk according to claim 5 wherein said radius of said outer film attachment surface is about 0.8 mm.

7. A stretched surface recording disk according to claim 1 further including raised annular ridges and annular film attachment surfaces disposed on the remaining major surface of said substrate identically to those described with respect to said one major surface and films supported by said annular ridges on each major surface and adhesively bonded to said film attachment surfaces on each major surface of said substrate.

* * * * *